UNITED STATES PATENT OFFICE.

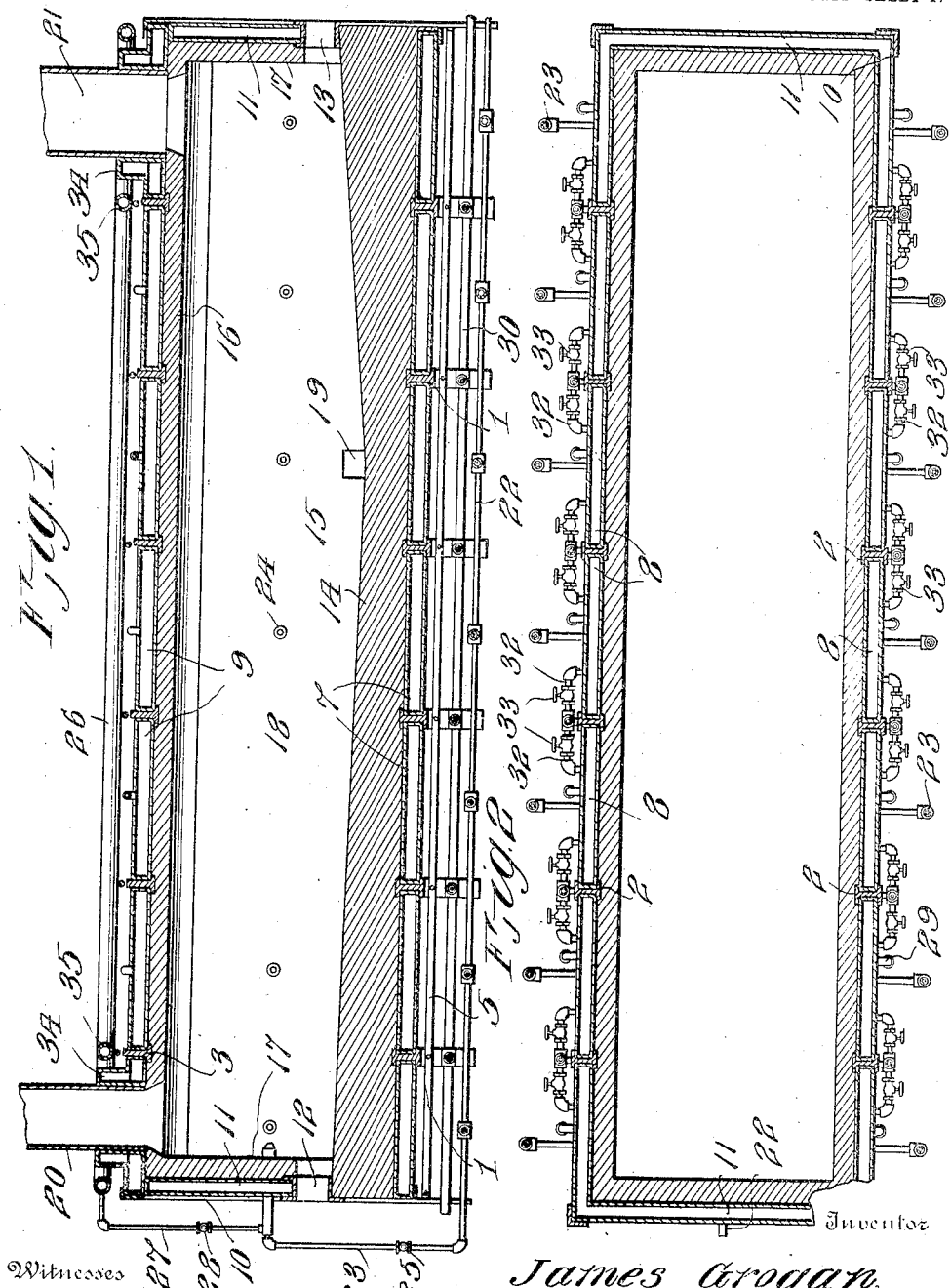

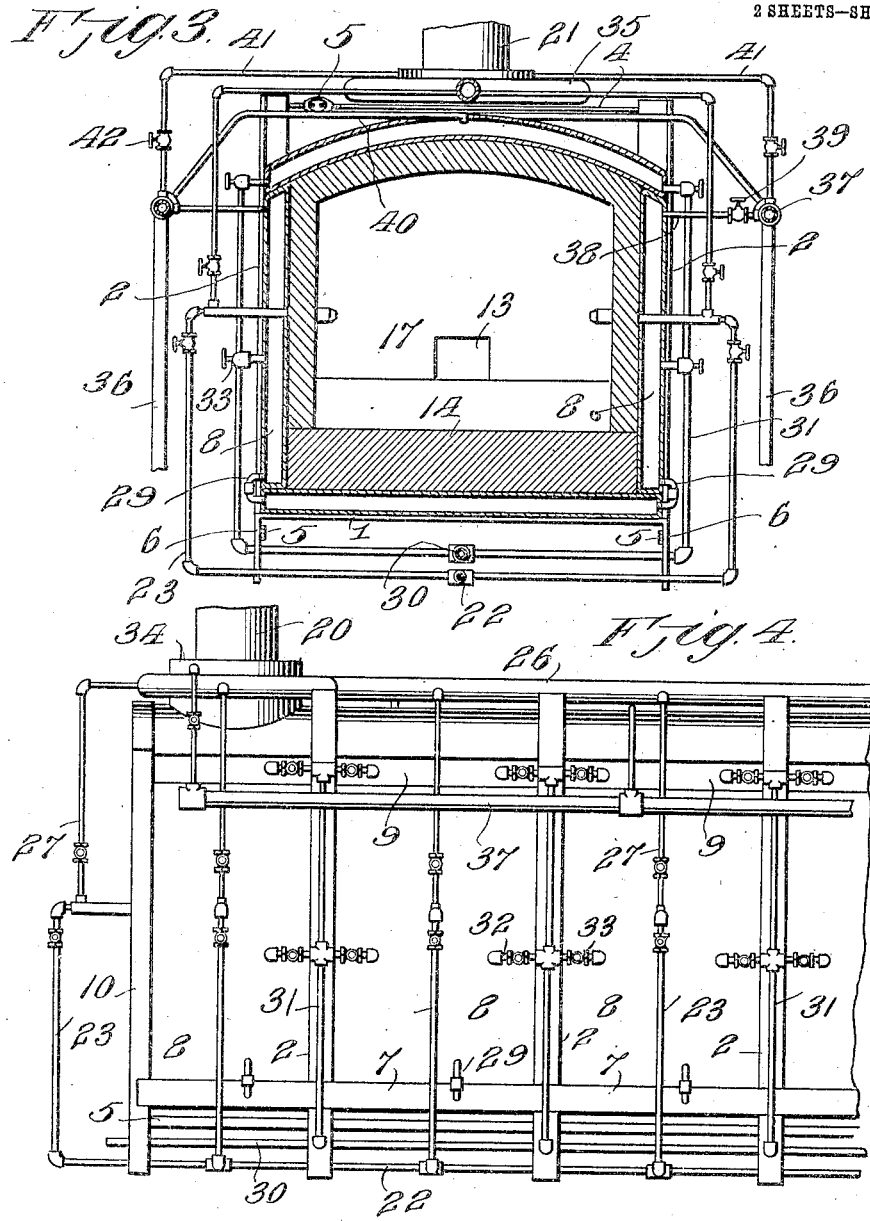

JAMES GROGAN, OF PRESCOTT, ARIZONA TERRITORY.

SMELTING-FURNACE.

957,554.  Specification of Letters Patent.  Patented May 10, 1910.

Application filed August 3, 1909. Serial No. 510,989.

*To all whom it may concern:*

Be it known that I, JAMES GROGAN, a citizen of the United States, residing at Prescott, in the county of Yavapai, Arizona Territory, have invented new and useful Improvements in Smelting-Furnaces, of which the following is a specification.

This invention relates to an apparatus in the nature of a smelting furnace for recovering the fine ores usually allowed to escape with the waste products of combustion from blast furnaces.

The main object of the invention is to provide a smelting furnace to which the products of combustion from one or more blast furnaces may be conducted and the fine particles of metal contained therein smelted and recovered for use.

A further object of the invention is to provide a smelting furnace of this character wherein provision is made for heating the smelting chamber thereof to an intensely high degree by the use of a hydrocarbon fuel such as crude oil.

A still further object of the invention is to provide a smelting furnace in which disintegration of the walls of the heating chamber from the intense heat generated will be deterred and the period of usefulness of such walls prolonged, and whereby the expense of operation and maintenance is accordingly decreased.

A still further object of the invention is to provide a smelting furnace having water-jacketed or cooling walls constructed and arranged to permit of their ready removal for repairs or replacement as occasion requires.

With these and other objects in view, the invention consists of the features of construction, combination and arrangement of parts hereinafter fully described and claimed, reference being had to the accompanying drawings, in which:—

Figure 1 is a vertical longitudinal section of a smelting furnace embodying my invention. Fig. 2 is a horizontal section of the same. Fig. 3 is a vertical transverse section. Fig. 4 is a side elevation of a portion of the furnace.

In carrying my invention into practice, I preferably provide a furnace of oblong rectangular form having an inlet for the waste products from the blast furnace at one end and an outlet for the final products of combustion from the smelting chamber at its opposite end. The structure of the furnace includes a metallic frame, bottom and top walls, and side and end walls, made in whole or part of metal and lined interiorly with fire brick or other suitable refractory material forming the lining or inner walls of the smelting chamber.

The frame structure as shown consists of a series of spaced transverse bottom beams 1, correspondingly arranged vertical side beams 2 and a series of transverse top beams 3, the beams of the respective sets being preferably arranged in alinement with each other and suitably connected to secure strength and durability. The bottom and side beams are preferably of I-form and the top beams of inverted T-form. The beams, in addition to being united in the manner described, are also connected wherever necessary by longitudinal and transverse tie rods 4, each formed of sections connected by a turn buckle 5, to enable the parts to be firmly secured and braced and adjusted to compensate for wear and inequalities of expansion when occasion requires.

The bottom beams may rest directly upon the earth or a suitable bed or foundation and are preferably provided with downturned portions or legs 6 which are utilized as supports for piping, as hereinafter described, and also as an anchoring means to firmly secure the furnace to its bed or foundation. The respective bottom, side and top walls are completed by hollow wall sections 7, 8 and 9 respectively, which also act as water jackets, as hereinafter set forth. The wall sections 7 and 8 fit and are held between the webs and flanges of the beams 1 and 2, while the wall sections 9 rest upon the bottom flanges of the beams 3 and extend between the webs of such beams, thus enabling them to be independently removed when worn or otherwise injured so that they may be repaired and replaced or new wall sections substituted therefor. In addition to holding the wall sections in assembled relation in the manner described and securing them by the parts of the piping, hereinafter set forth, they may be detachably connected by auxiliary fastenings of any preferred type.

The end walls of the furnace are formed by suitable frame plates 10 and hollow wall sections 11, the edges of which are suitably engaged with the end sections of the remaining walls. The respective end walls are provided with doors or openings 12 and 13 for the removal of the slag or other deposits upon the bottom wall of the furnace chamber. The bottom, side, top and end walls formed in the manner described are provided with linings 14, 15, 16 and 17 of fire brick or other suitable refractory material, which form the inner walls of a crucible or smelting chamber 18. The upper lining 16 is of arched form and provides a surface against which the fine particles of ore carried by the escaping products from the blast furnace impinge by the travel of the gases along said surface and which is maintained in a state of incandescence by the heating means within said chamber to smelt said particles, which drop by gravity onto the upper surface of the bottom wall 14. The said upper surface of the wall 14 is inclined from the doors 12 and 13 to an intermediate or lowest point, to which the smelted metal travels, a door 19 being provided in one of the side walls in transverse alinement with such lowest point or depression, through which the recovered metal may be withdrawn.

A flue or inlet pipe 20 communicates through the top wall with one end of the smelting chamber 18 and is designed to be connected in practice with the down-takes of one or more blast furnaces, so that the waste products—smoke, gases and dust, carrying with them in suspension fine particles of metal—escaping from the blast furnace will be conducted into the chamber 18 and brought by their force of travel and upward flow under their increase of temperature into contact with the incandescent arch 16, by which the metallic particles will be smelted as described and drop down upon the bottom wall or lining 14, whereby all of the particles of metal usually allowed to vent to the atmosphere from the blast furnace may be recovered and used. An exhaust flue or pipe 21 communicates with the opposite end of the smelting chamber through the top wall for the discharge of the final products of combustion therefrom. As a result of this construction, all or the greater proportion of metal exhausted from one or more blast furnaces may be recovered in a simple and effective manner, preventing the waste which usually occurs, and as a single apparatus of this type will operate upon the exhaust from a number of blast furnaces economy in operation is insured.

Extending beneath the furnace is a pipe 22 leading from a suitable source of crude oil supply, from which pipe projects vertical branches 23 communicating with injector burners 24 extending through the side and one of the end walls into the smelting chamber, each of said branches being provided with a valve 25 whereby the feed of oil to the associated burner may be controlled. The oil is injected through the burners in the form of a fine spray or vapor commingled with air or steam. The air or steam is supplied from a suitable source through a pipe 26 extending longitudinally above the top wall and provided with branches 27 communicating with the respective burners and each provided with a valve 28 whereby the feed of air or steam may be controlled. Where air is employed, it is supplied from a compressor or storage reservoir at a determined degree of pressure, whereby the oil will be vaporized and a sufficient amount of oxygen supplied to support combustion. The flames from the vaporized mixture issuing from the burners, as well as the ignition of the gases of the products of combustion will heat the interior of the chamber to a high degree and the wall 16 to the point of incandescence. As more or less sulfur fumes are contained in the products, it will be understood that a fuel agent is thus supplied without cost, whereby, upon the ignition of this agent after the furnace has been in operation for a certain length of time, the amount of fuel oil supplied may be reduced with attendant economy.

The hollow wall sections are connected wherever necessary for the circulation of water therethrough by unions 29, and said sections are supplied with water through a main supply pipe 30 having branches 31 leading thereto, each branch being connected with adjacent wall sections by leads or laterals 32, each provided with a controlling valve 33, so that the amount of water supplied to the hollow walls of the structure may be regulated as occasion demands. The end sections of the top wall are provided with hollow domes or extensions 34 which inclose the flues 20 and 21, and which are surrounded by annular portions 35 of the air supply pipe 26, by which the air may be more or less heated by radiation from the surrounding surfaces of the walls on its passage to the fuel injectors. When the smelter is in operation a circulation of water is established through the hollow walls, whereby the interior refractory lining is prevented from being overheated, a portion of the heat being taken up by the water so as to enable the linings to be used for a greater period than ordinarily without disintegration from excess heat. Overflow pipes 36 are provided at each side of the apparatus for the discharge of water and communicate with a main longitudinal overflow, waste or vent pipe 37 having branches 38 leading into the upper ends of the hollow wall sections 8 for the discharge of the heated water therefrom, each of said branches being provided with a controlling valve 39. Also leading to said pipe 37 from the hollow top walls 9 and the drums 34 are branch pipes 40 and 41, spectively, provided with controlling valves 42, by which the hot water is discharged therefrom.

In the operation of the apparatus, it will be understood that the injector burners are first set into action and when the smelting chamber is heated to the necessary degree communication is established between the blast furnace and said chamber, whereby the products discharging through the downtakes of the blast furnace will pass into the smelting chamber through the flue 20. These products contain more or less sulfur fumes which become raised to the point of incandescence and ignited and increase the intensity of the heat. The heated products passing through the smelting chamber are therefore heated to a higher degree, rise and come in contact with the incandescent arch 16, whereby the fine particles of metal commingled therewith will be smelted and fall upon the bottom wall or lining 14 and flow to the depressed portion thereof, whence they may be removed through the outlet 19, as before described. The final incombustible portion of the product exhausts through the flue or stack 21, as will be readily understood. By this means the fine particles of metal usually allowed to exhaust with the products of combustion from blast furnaces may be smelted and recovered, and a single smelting apparatus will serve for use in connection with a plurality of blast furnaces, with attendant economy of operation.

The construction of the smelting furnace not only permits of repairs being readily made, but also preserves the walls from rapid disintegration reducing the cost of maintenance to the minimum.

I claim:—

1. An apparatus for recovering the waste products from blast furnaces comprising a smelting chamber, means for conducting the products thereto, means for smelting and separating the particles of metal from the products, and means for discharging the final products from said chamber.

2. An apparatus for recovering the waste products from blast furnaces comprising a smelting chamber having a refractory lining, means for cooling said lining, means for conducting the products to said chamber, means for heating the chamber to smelt and separate the fine particles of metal from the products, and means for discharging the final spent products from said chamber.

3. An apparatus for recovering the waste products from blast furnaces comprising a smelting chamber having a refractory lining, a water jacket inclosing said lining, means for circulating water therethrough, means for conducting the products to the smelting chamber, means for discharging the final spent products therefrom and means for heating said smelting chamber.

4. An apparatus for recovering the waste products from blast furnaces comprising a smelting chamber having a refractory lining, a water jacket composed of sectional walls inclosing the lining, means for circulating water therethrough, means for conducting the products to said chamber, means for discharging the final spent products therefrom, and means for heating the chamber.

5. An apparatus for recovering the waste products from blast furnaces comprising a smelting chamber having a refractory lining and provided with inlet and exhaust flues and an outlet for the discharge of the recovered metal, a water jacket composed of sections formed of walls inclosing said lining, injector burners extending through said walls and lining into said chamber, and means for supplying a fuel element to said burners.

6. An apparatus for recovering the waste products from blast furnaces comprising a smelting chamber having a refractory lining and provided with inlet and outlet flues, said lining being provided with a bottom wall having its surfaces inclining to an outlet, a water jacket formed of detachable sections inclosing the lining, means for circulating water therethrough, injector burners extending through the walls and lining into the chamber, and means for supplying a fuel element to said burners.

7. An apparatus for recovering the waste products from blast furnaces comprising a smelting chamber having a refractory lining, inlet and exhaust flues and an outlet for the recovered metal, the bottom wall of the lining having inclined surfaces leading to said outlet, a water jacketed wall inclosing the lining and composed of communicating detachably mounted sections, means for supplying water thereto, means for exhausting water therefrom, injector burners extending through said wall and lining into the chamber, and a fuel supply pipe having valved branches communicating therewith.

In testimony whereof I affix my signature in presence of two witnesses.

JAMES GROGAN.

Witnesses:
RALPH B. WILLIAMS,
S. CORMICK.